United States Patent [19]
Duga

[11] Patent Number: 4,722,748
[45] Date of Patent: Feb. 2, 1988

[54] GOB DISTRIBUTOR

[75] Inventor: Robert J. Duga, Enfield, Conn.

[73] Assignee: Emhart Industries, Inc., Farmington, Conn.

[21] Appl. No.: 18,143

[22] Filed: Feb. 24, 1987

[51] Int. Cl.$^4$ ............................................. C03B 7/20
[52] U.S. Cl. ........................................ 65/225; 65/164; 65/304
[58] Field of Search ................ 65/159, 164, 165, 171, 65/225, 304

[56] References Cited
U.S. PATENT DOCUMENTS

| | | | |
|---|---|---|---|
| 3,775,083 | 11/1973 | Nebelung et al. | 65/225 |
| 4,357,158 | 11/1982 | Garza | 65/304 X |
| 4,566,894 | 1/1986 | Kulig et al. | 65/225 X |
| 4,599,101 | 7/1986 | Douglas et al. | 65/164 |

Primary Examiner—Arthur Kellogg
Attorney, Agent, or Firm—Spencer T. Smith

[57] ABSTRACT

A gob distributor is disclosed having a head including at least one gob scoop having a pinion and a rack for interconnecting with the pinion so that the gob scoop can be rotatively displaced through a predetermined angular range. The rack is displaced by a ball screw assembly wherein a vertically oriented forked link having a bottom end and two vertically spaced top ends connects the rack to the ball screw nut. Each of the top ends is secured to ball screw nut so that the link can be reoriented relative to the ball screw nut about a vertical axis passing through the top ends to compensate for misalignment between the ball screw and the link and the bottom end is connected to the rack so that any out of parallelism in either a horizontal or a vertical plane between the link and the rack will be accommodated.

3 Claims, 5 Drawing Figures

GOB DISTRIBUTOR

The present invention relates to mechanisms for distributing glass gobs received from a gob feeder to discrete glassware forming stations.

Gob distributors include a head which usually includes a plurality of gob scoops which can be selectively rotated by displacing a rack which interconnects with a pinion secured to each gob scoop. The rack may be displaced by a servo driven ball screw assembly. In such an arrangement there may be some misalignment between the rack and the ball screw and such misalignment will impose unwanted stresses on the feed system.

It is accordingly an object of the present invention to provide a coupling for linking the rack to the ball screw assembly which will compensate for any misalignment between the rack and the ball screw.

Other objects and advantages of the present invention will become apparent from the following portion of this specification and from the accompanying drawings which illustrate, in accordance with the mandate of the patent statutes, a presently preferred embodiment incorporating the principle of the invention.

Referring to the drawings.

Figure 2:
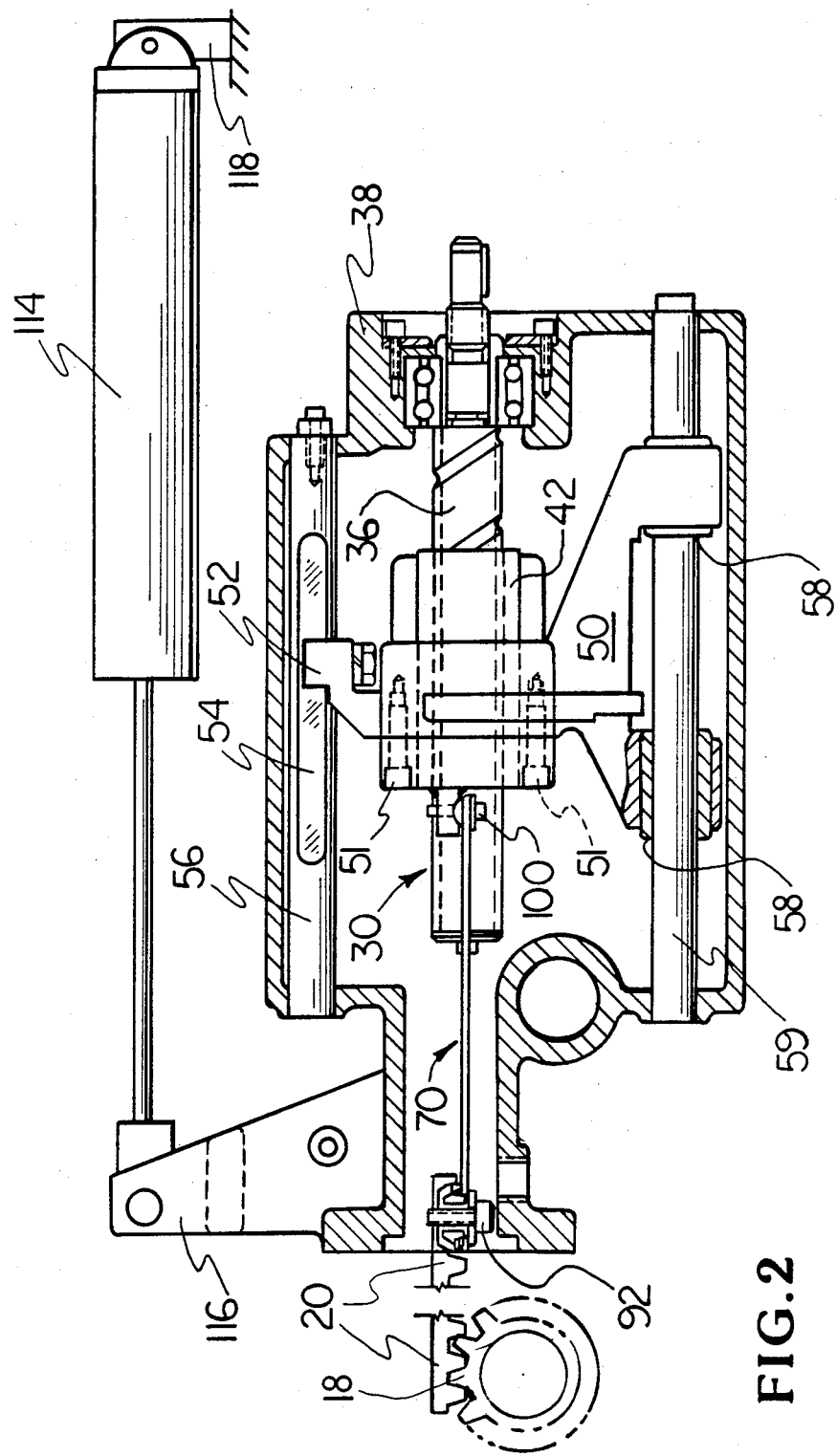
FIG. 2 is a view looking downwardly into the lower casting of the ball screw housing.

The gob distributor includes a head 10 which has a housing 12 supporting a number of gob scoops 14. These scoops 14 receive and redirect gobs to a fixed array of troughs (not shown) which feed discrete glassware forming stations. The housing also supports a corresponding number of gob receiving ends 16 which receive gobs from a gob feeder and guide these gobs to the scoops 14. As illustrated in FIG. 2, each gob scoop 14 has a pinion 18 which interconnects with a rack 20 so that the gob scoops can be rotatively displaced in unison through a desired angular range by selective displacement of the rack.

Figure 1:
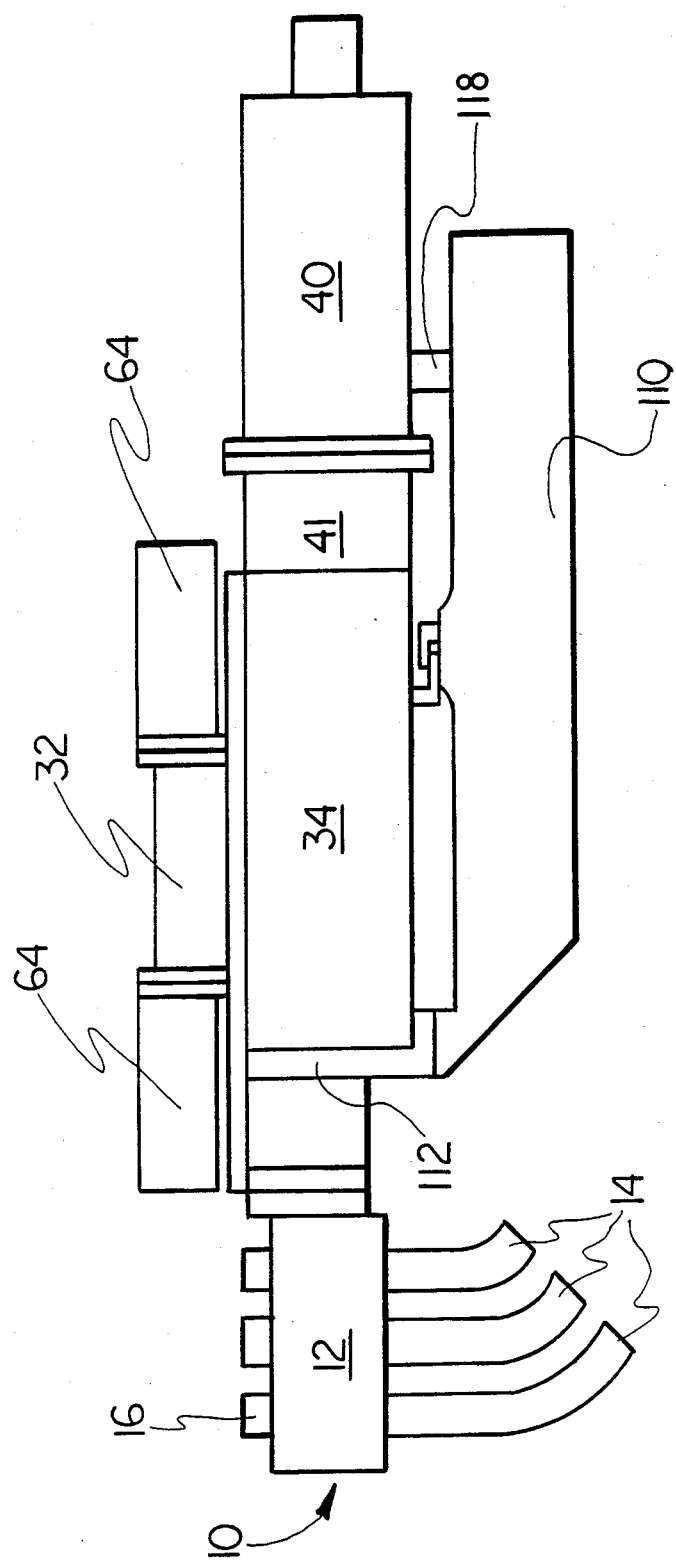
FIG. 1 is a side elevation view of a gob distributor made in accordance with the teachings of the present invention.

The displacement of the rack is controlled by a ball screw assembly 30 (FIG. 2) which is contained within a housing having upper 32 and lower 34 parts (FIG. 1). As shown in FIG. 2, a ball screw 36 is journalled into the right end wall 38 of the lower housing 34. Rotation of the ball screw 36 by a servo motor 40 via a coupling 41, advances or retracts a ball screw nut 42. To maintain this ball screw nut 42 at its desired orientation throughout its displacement a carriage 50 is secured to the ball screw nut 42 via bolts 51. The carriage 50 extends towards one side of the lower housing 34 and rotatably supports upper 52 and lower (not shown) rollers which ride on flats 54 (only the top flat is shown) defined on a support rod 56 extending between the ends of the lower housing 34. The carriage 50 also extends toward the other side of the lower housing 34 and supports a pair of axially spaced cylindrical bushings 58 which slide along a second rod 59. This rod 59 extends, parallel to the first rod 56, between the ends of the lower housing 34.

Figure 3:
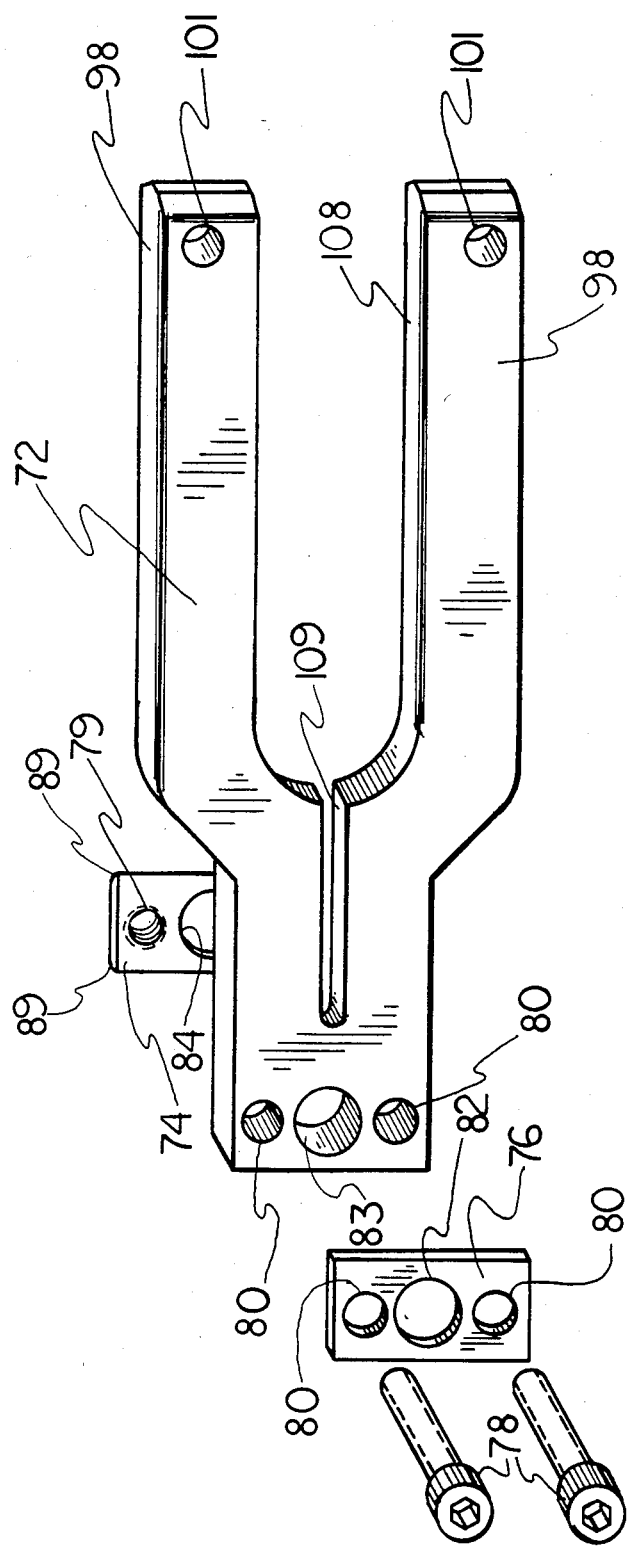
FIG. 3 is an oblique exploded view of the coupling link and left end alignment structure of the gob distributor illustrated in FIG. 2.
Figure 4:
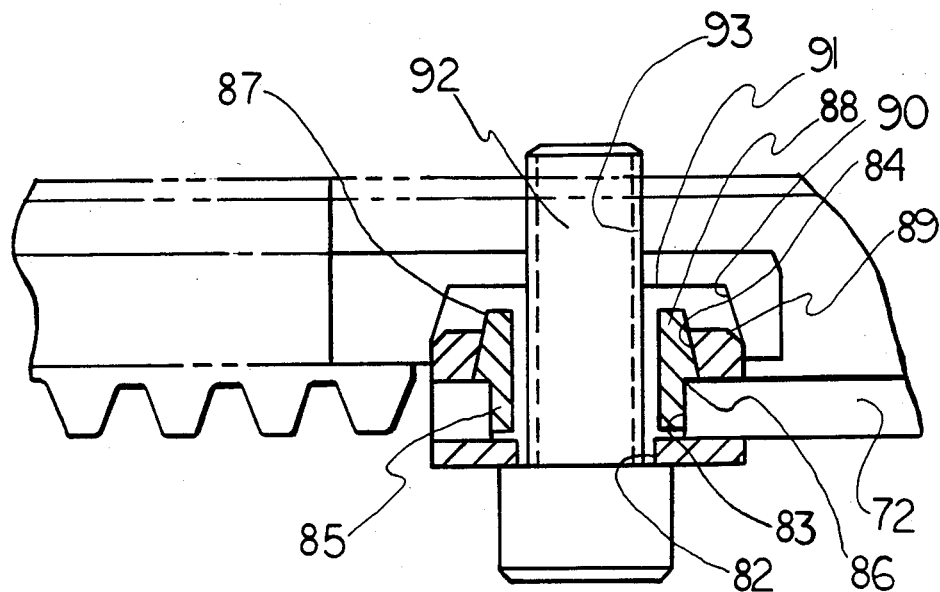
FIG. 4 is an enlayed illustration of another portion of the gob distributor illustrated in FIG. 2.

A coupling 70 extends between the rack 20 and the ball screw nut 42 and includes a forked link 72 (FIG. 3). An alignment device having a partial cyclindrical wedge plate 74 and a securement plate 76 are secured to the left hand (bottom) end of the forked link by shoulder screws 78 which are received by threaded bores 79 in the wedge plate plate 74. These screws pass freely through enlarged bores 80 in wedge plate 74 and in the bottom of the link 72 thereby permitting limited rotation of the joined plates 74, 76 about a horizontal axis extending through the large center holes 82, 83, 84 in the securement plate 76, link 72 and wedge plate 74. As can be seen from FIG. 4 the sleeve portion 85 of a cylindrical wedge element 86 is inserted into the large link bore 83 and the conical surface 87 of the wedge portion 88 of the wedge element 86 matingly engages with the conical surface of the wedge plate center hole 84.

The sides 89 of the wedge plate 74 are curved to wedge into the curved sides 90 of a vertical channel 91 defined across the rack 20. The link will be connected to the rack by a bolt 92 which extends freely through the larger center holes 82, 83, 84 and is received by a threaded hole 93 in the rack channel 91.

The alignment device can rotate around the wedge element 86 to accommodate for any departure of the rack channel 91 from its desired vertical orientation (any out of parallelism in the vertical plane between the link and the rack) and the wedged sides 89 of the wedge plate 74 will accommodate any out of parallelism in a horizontal plane between the rack 20 and the link 72.

Figure 5:
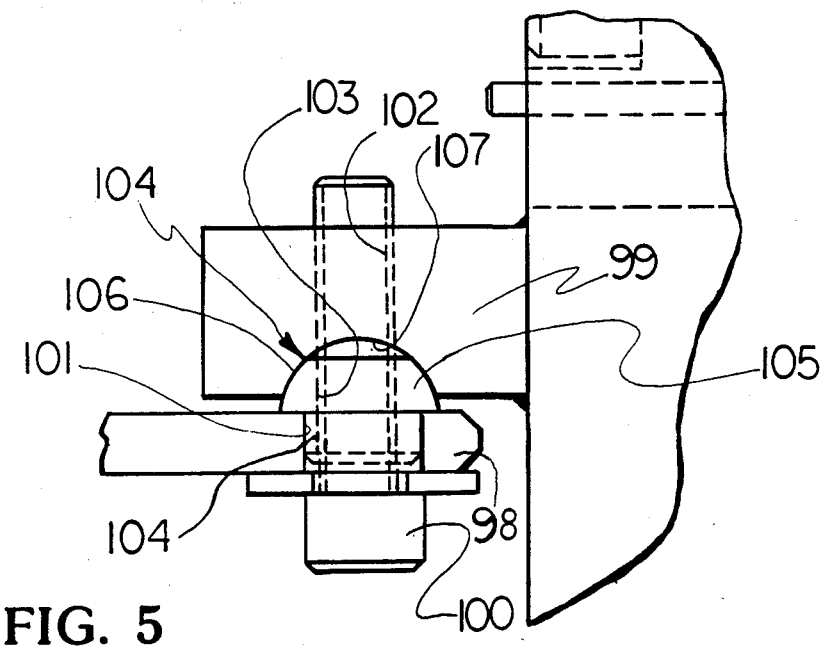
FIG. 5 is an enlarged illustration of a portion of the gob distributor illustrated in FIG. 2.

To permit reorientation of the top (right) ends 98 of the forked link 72 about a vertical axis each top end 98 is secured to a ball screw nut bracket 99 (FIG. 5) by a bolt 100 which passes through a link aperture 101 and is received by a threaded aperture 102 in the bracket 99. The bolt 100 passes through a bore 103 in a wedge element 104 which has a sleeve portion 104 received within the link aperture 101 and a bearing portion 105 having a cylindrical surface 106 which matingly engages with a cylindrical surface 107 defined in the bottom surface of the bracket 99. Since the inner bore 103 of the wedge element 104 is larger than the bolt 100, the wedge element 104 and hence the link 72 can be rotatively realigned about a vertical axis to compensate for any out of parallelism in a horizontal plane between the link 72 and the ball screw 36. Realignment of the wedge elements 104 is also possible about the horizontal axis coincident with the axis of the inner bore 103.

The link 72 has a large slot 108 for clearing the ball screw 36 throughout its range of displacement and has a small slot 109 which continues the large slot 108 towards the bottom of the link 72. The link may accordingly twist or bend to accommodate forces generated during rack displacement due to any non-alignment between the rack and the ball screw.

The ball screw housing is supported by a support bracket 110 for pivotal movement about a vertical shaft 112 and the entire gob distributor including the head 10, ball screw assembly 30 and the servo drive nut 40 and coupling 41 can be pivoted from an operative position to a remote position by operating the retract cylinder 114 which extends between a support bracket arm 116 and a lower housing arm 118.

I claim:
1. A gob distributor comprising
   a head including at least one gob scoop having a pinion and a rack for interconnecting with said pinion so that said gob scoop can be rotatively displaced through a predetermined angular range;

means for displacing said rack including
a ball screw,
a ball screw nut,
a vertically oriented forked link having a bottom end and two vertically spaced top struts, means for securing the top end of each of said to said ball screw nut so that said link can be reoriented relative to said ball screw nut about a vertical axis passing through said top ends to compensate for misalignment between said ball screw and said link and means for securing said bottom end to said rack so that any out of parallelism in either a horizontal or vertical plane between said link and said rack will be accommodated, said struts being selectively spaced to clear said ball screw throughout its displacement range.

2. A gob distributor according to claim 1 where each of said top ends of the link has a horizontally extending thru-hole therein and said means for securing said top ends of the link each comprises:
a wedge element having a sleeve portion for insertion into one of said thru-holes and a wedge portion having a bearing surface,
a bearing surface associated with said wedge element bearing surface,
bolt means extending freely through said wedge elements and said link thru-holes and threadingly received by said ball screw nut.

3. A gob distributor according to claim 2, wherein said means for securing said bottom link end to said rack comprises:
a secured plate on one side of said link,
a wedge plate on the other side of said link,
vertically spaced screw means extending through link thru apertures for interconnecting said plates,
said link thru apertures being larger than said screw means whereby said plates can be reoriented about a horizontal axis.

* * * * *